United States Patent
Hahm et al.

(10) Patent No.: US 9,594,417 B2
(45) Date of Patent: Mar. 14, 2017

(54) SCREEN IMAGE MIRRORING METHOD AND APPARATUS

(71) Applicant: Samsung Electronics Co., Ltd., Suwon-si, Gyeonggi-do (KR)

(72) Inventors: Seong-il Hahm, Yongin-si (KR); Pil-seob Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

(21) Appl. No.: 14/483,607

(22) Filed: Sep. 11, 2014

(65) Prior Publication Data
US 2015/0082058 A1    Mar. 19, 2015

(30) Foreign Application Priority Data
Sep. 13, 2013    (KR) .................... 10-2013-0110623

(51) Int. Cl.
*G06F 1/32* (2006.01)
*G06F 3/14* (2006.01)

(52) U.S. Cl.
CPC .............. *G06F 1/32* (2013.01); *G06F 1/3234* (2013.01); *G06F 3/1423* (2013.01); *G06F 3/1454* (2013.01); *G09G 2330/021* (2013.01)

(58) Field of Classification Search
CPC ........ G06F 1/32; G06F 1/3234; G06F 3/1423; G06F 3/1454; G09G 2330/021
See application file for complete search history.

(56) References Cited

U.S. PATENT DOCUMENTS

| 5,978,923 A * | 11/1999 | Kou ...................... G06F 1/3203 713/320 |
|---|---|---|
| 2001/0011992 A1 | 8/2001 | Juen et al. |
| 2006/0244691 A1 | 11/2006 | Lee |
| 2011/0007021 A1 | 1/2011 | Bernstein et al. |
| 2012/0254808 A1 | 10/2012 | Gildfind |
| 2013/0104023 A1 | 4/2013 | Nielsen et al. |
| 2013/0162502 A1 | 6/2013 | Lee et al. |
| 2013/0210397 A1 * | 8/2013 | Nakajima ............... H04W 8/22 455/414.1 |

(Continued)

FOREIGN PATENT DOCUMENTS

| EP | 2079072 A2 | 7/2009 |
|---|---|---|
| KR | 10-1218295 B1 | 1/2013 |
| WO | 2009/028892 A2 | 3/2009 |

*Primary Examiner* — Thomas Lee
*Assistant Examiner* — Mohammad A Rahman
(74) *Attorney, Agent, or Firm* — Jefferson IP Law, LLP (57) ABSTRACT

A display apparatus for mirroring a screen image is provided. The display apparatus includes a display unit configured to display a predetermined screen image, an input unit configured to receive a predetermined command or data, a control unit configured to control the predetermined screen image to be transmitted to another display apparatus in order to make the other display apparatus mirror the predetermined screen image, and to reduce power consumption used to display the predetermined screen image when screen image mirroring is requested, and a communication unit configured to transmit the predetermined screen image to the other display apparatus. Also, the display apparatus reduces the power consumption caused when a mirroring service is used.

18 Claims, 7 Drawing Sheets

(56) References Cited

U.S. PATENT DOCUMENTS

| | | | |
|---|---|---|---|
| 2014/0019786 A1* | 1/2014 | Green | H04W 52/0258 713/320 |
| 2014/0049493 A1* | 2/2014 | Nojima | G09G 5/006 345/173 |
| 2014/0292816 A1* | 10/2014 | Shigemasa | G09G 5/12 345/660 |
| 2015/0061968 A1* | 3/2015 | Park | G06F 3/1423 345/2.1 |
| 2015/0319692 A1* | 11/2015 | Green | H04W 52/0258 713/320 |

* cited by examiner

SCREEN IMAGE MIRRORING METHOD AND APPARATUS

CROSS-REFERENCE TO RELATED APPLICATION(S)

This application claims the benefit under 35 U.S.C. §119 (a) of a Korean patent application filed on Sep. 13, 2013 in the Korean Intellectual Property Office and assigned Serial number 10-2013-0110623, the entire disclosure of which is hereby incorporated by reference.

TECHNICAL FIELD

The present disclosure relates to a method of mirroring a screen image and an apparatus thereof. More particularly, the present disclosure relates to a method of mirroring at least one screen image displayed on at least one display apparatus, and displaying the at least one screen image on at least one display apparatus other than the at least one display apparatus on which the at least one screen image is displayed, and an apparatus thereof.

BACKGROUND

Due to development of wired and wireless communication networks, electronic devices that display screen images and output data that may be visually recognized by users may be interconnected via the wired and wireless communication networks.

The electronic devices may share various kinds of data with other electronic devices via the wired and wireless communication networks, and one electronic device may control another electronic device at a remote distance. Alternatively, one electronic device may be used via another electronic device. A mirroring technology may be used for the remote control or the data sharing between electronic devices.

The mirroring technology is a technology that ensures screen image data be shared and manipulated between devices that respectively have display units. The mirroring technology makes personal computers share the screen image with each other, and display the shared screen image.

In addition, the mirroring technology has been widely developed to be applied to all electronic devices that may output screen images through display units, examples of which are portable computers such as notebook computers, netbooks, tablet computers, portable terminals such as smart phones, Personal Digital Assistants (PDAs), or smart TeleVisions (TVs).

For example, technologies for providing the mirroring service, which makes the electronic devices share the screen images and control each other at a remote distance due to the mirroring technology, include a Display as a Service (DaaS), a MIRACAST, an AIRPLAY, etc.

Hereinafter, all the electronic devices that may use the mirroring service by sharing and displaying the screen images will be referred to as 'display apparatuses'.

With regard to the mirroring service, at least one device that provides an image transmits the image to at least one device that receives the image. The device that provides the image may be referred to as a source device or a master device, and the device that receives the image may be referred to as a sink device or a client device. In the present disclosure, the device that provides the image may be referred to as the master device, and the device that receives the image may be referred to as the client device.

The electronic devices have been developed to consume low power, and to help users use the devices rather conveniently. Therefore, a display apparatus that consumes the minimum amount of power and increases a user's convenience is needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of mirroring a screen image that reduces power consumed while a mirroring service is performed, and a display apparatus thereof.

Another aspect of the present disclosure is to provide a method of mirroring a screen image that increases user's convenience while a mirroring service is performed.

Additional aspects will be set forth in part in the description which follows and, in part, will be apparent from the description, or may be learned by practice of the presented embodiments.

In accordance with an aspect of the present disclosure, a display apparatus is provided. The display apparatus includes a display unit configured to display a predetermined screen image, an input unit configured to receive a predetermined command, a control unit configured to reduce a power consumption used to display the predetermined screen image when screen image mirroring is requested, and a communication unit configured to transmit the predetermined screen image to the other display apparatus.

In accordance with an aspect of the present disclosure, a method of mirroring a screen image is provided. The method includes displaying a predetermined screen image, when screen image mirroring is requested, transmitting the predetermined screen image to another display apparatus in order for the other display apparatus to mirror the predetermined screen image, and reducing a power consumption used to display the predetermined screen image when the screen image mirroring is performed.

In accordance with an aspect of the present disclosure, a mirroring apparatus is provided. The mirroring apparatus includes a first display apparatus, and a second display apparatus configured to mirror a screen image displayed on the first display apparatus and display the mirrored screen image. The first display apparatus includes a first display unit configured to display a predetermined screen image, a first input unit configured to receive a predetermined command or data, a first control unit configured to control the predetermined screen image to be transmitted to the other display apparatus in order for the other display apparatus to mirror the transmitted predetermined screen image, and to reduce a power consumption used to display the predetermined screen image, and a communication unit configured to transmit the predetermined screen image to the other display apparatus. The second display apparatus includes a second communication unit connected to the first communication unit through a predetermined network, and configured to receive the predetermined screen image, and a second display unit configured to display the received predetermined screen image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
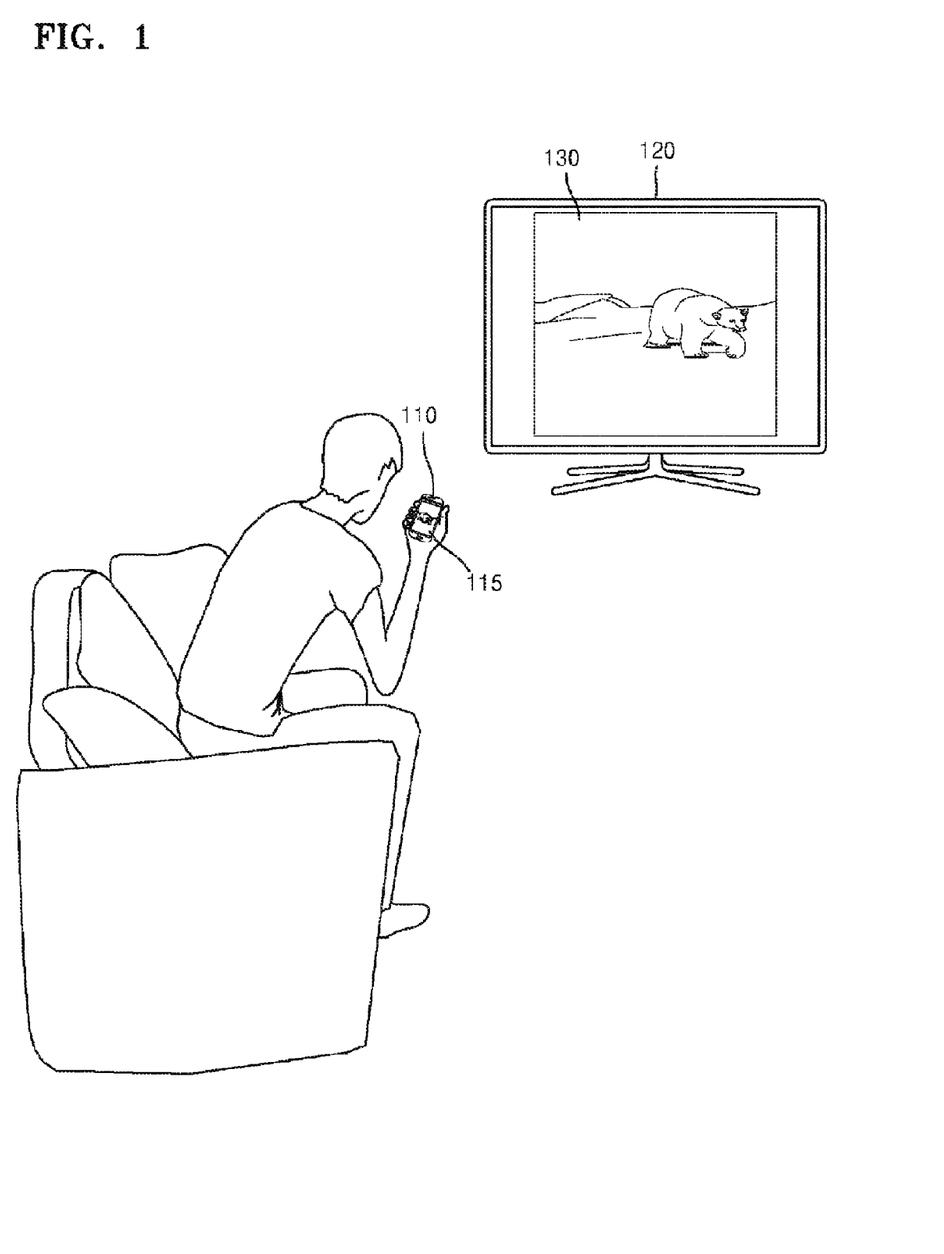
FIG. 1 is a view illustrating a mirroring technology according to an embodiment of the present disclosure.

FIG. 1 is a view illustrating a mirroring technology according to an embodiment of the present disclosure.

Referring to FIG. 1, a master device is a smart phone 110 that a user holds in his/her hand, and a client device is a smart TeleVision (TV) 120 that the user watches. The user may use a mirroring service between the smart phone 110 and the smart TV 120 in order to use video clips, applications, photos, or the like stored in the smart phone 110. The smart phone 110 and the smart TV 120 may be interconnected through a predetermined network (not shown). When the mirroring service is used, a screen image to be output to a display unit 115 of the smart phone 110 is mirrored, and the screen image is output to a display unit 130 of the smart TV 120.

For example, suppose that a menu screen image that is displayed on the display unit 115 is mirrored and displayed on the display unit 130.

A direction of the user's eyes should frequently move from the display unit 115 of the smart phone 110 to the display unit 130 of the smart TV 120, and vice versa in order for the user to manipulate the menu screen image output from the display unit 115 of the smart phone 110, and to watch video data that the user wants through the display unit 130 of the smart TV 120, because the user using the mirroring service wants to perform an input through the display unit 115 of the smart phone 110, and to watch the output through the display unit 130 of the smart TV 120.

Also, with a high possibility, the user may watch the display unit of a client device that outputs a mirroring screen image when the user uses the mirroring service. Therefore, the present disclosure provides an apparatus of reducing power consumption of the display apparatus that the user does not directly watch, for example, the master device and a method thereof while using the mirroring service.

In addition, the present disclosure provides an apparatus for overcoming inconvenience of the user, which results from the fact that the user should watch both the master device and the client device, and a method for overcoming the inconvenience of the user while using the mirroring service.

Figure 2:
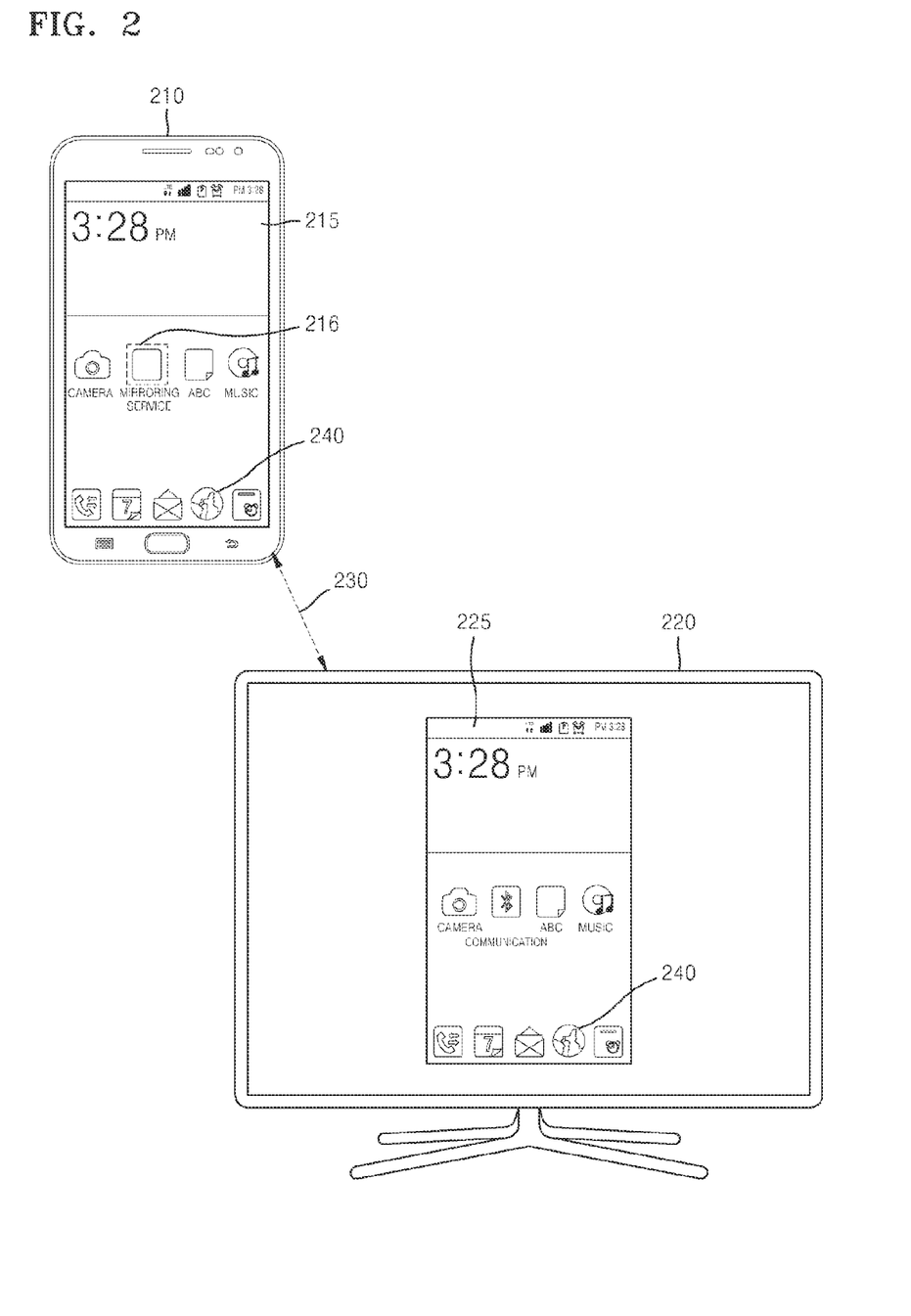
FIG. 2 is a view of a display apparatus according to an embodiment of the present disclosure.

FIG. 2 is a view of a display apparatus according to an embodiment of the present disclosure.

The display apparatus according to the embodiment of the present disclosure is an electronic device that may use the mirroring service.

Referring to FIG. 2, a plurality of display apparatuses 210 and 220 are interconnected through a predetermined network 230, and may control another apparatus (not shown) in a remote distance, or use the other apparatus through the predetermined network 230.

The display apparatuses 210 and 220 performing the mirroring service include at least one master device and at least one client device, and the at least one master device and the at least one client device may be interconnected through the wired or wireless network.

Figure 3:
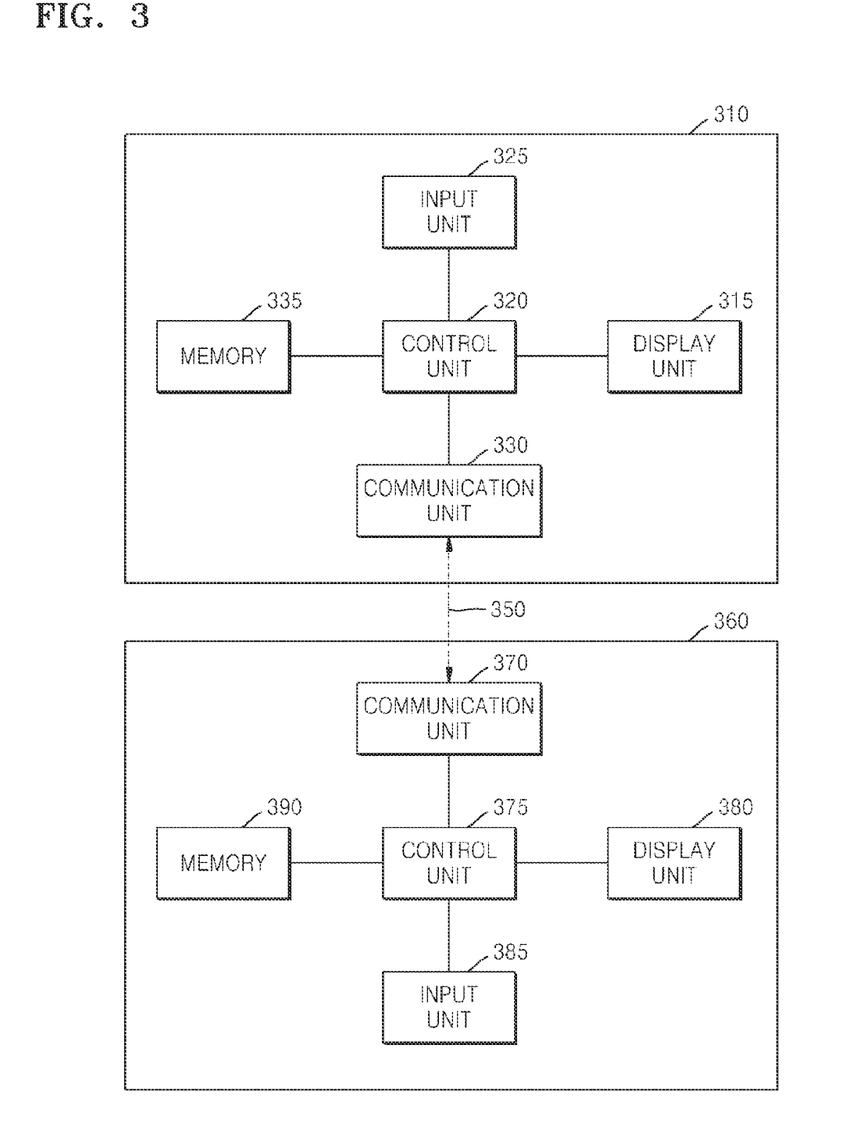
FIG. 3 is a block diagram illustrating a display apparatus according to an embodiment of the present disclosure.

Referring to FIGS. 2 and 3, the display apparatuses 210 and 220 will be described. The display apparatuses 210 and 220 illustrated in FIGS. 2 and 3 are electronic devices including display units such as portable computers such as a notebook computer, a netbook, or a tablet PC, portable terminals such as a smart phone, a Portable Multimedia Player (PMP), or a Personal Digital Assistant (PDA), a computer, a smart TV, or the like.

Also, the at least one master device and the at least one client device may be interconnected in various ways.

In particular, the at least one master device and the at least one client device may be interconnected by one-to-one (1:1) network topology.

Also, one master device and multiple client devices may be interconnected by one-to-many (1:n) network topology. Here, n indicates a plural number of client devices.

Multiple master devices and one client device may be interconnected by many-to-one (n:1) network topology. Here, n indicates a plural number of master devices.

Also, multiple master devices and multiple client devices may be interconnected by many-to-many (m:n) network topology. Here, m indicates a plural number of master devices, and n indicates a plural number of client devices.

FIGS. 2 and 3 illustrate a case that one master device and one client device are interconnected by the one-to-one network topology, and the mirroring service is provided according to an embodiment of the present disclosure.

Referring to FIG. 2, a screen image of the smart phone 210 that is the master device and that of the smart TV 220 that is the client device are illustrated. Each of the display apparatuses 210 and 220 may be any one of the master device and the client device.

Referring to FIG. 2, the master device 210 displays an interface screen image on which a plurality of menus are represented as icons. In particular, a menu screen image 215 may include camera, mirroring service, dictionary (represented as 'ABC'), music player (represented as 'MUSIC') icons or the like.

The user may send a request for implementing the mirroring service by touching the mirroring service icon 216 on the menu screen image 215. When the master device 210 executes use of the mirroring service, the master device 210 encodes the menu screen image 215 that is being displayed, and transmits the encoded video data to the client device 220 through the predetermined network 230. The client device 220 decodes the transmitted video data, and displays the decoded video data.

The predetermined network 230 is the wired or wireless network that may receive or transmit the predetermined data. For example, the predetermined network 230 may be formed according to a variety of communication network standards such as a Local Area Network (LAN), a Wide Area Network (WAN), a Wireless LAN (WLAN) (e.g., WiFi), a Wireless Broadband (WiBro), Code Division Multiple Access (CDMA), Wideband Code Division Multiple Access (WCDMA), Near Field Communication (NFC), etc.

Accordingly, when the screen image mirroring is performed, the client device 220 displays the same screen image 225 as the menu screen image 215 displayed on the master device 210. Hereinafter, a screen image-mirroring request and its implementation may be the same as a mirroring service request and its implementation.

The user may select and use a menu of the master device 210, for example, an Internet menu 240 while looking at the menu screen image 225 displayed on the client device 220.

The detailed structures of the master and client devices 210 and 220 will be respectively described in detail later with reference to FIG. 3.

FIG. 3 is a block diagram illustrating the display apparatuses 310 and 360 according to an embodiment of the present disclosure. Each of the display apparatuses 310 and 360 is an electronic device that executes the mirroring service through the predetermined network 230, and may be one of the master and client devices 210 and 220.

Referring to FIGS. 2 and 3, master and client devices 310 and 320 of FIG. 3, respectively, correspond to the master and client devices 210 and 220 of FIG. 2. Therefore, the repeated descriptions with regard to the master and client devices 310 and 320 of FIG. 3 will be omitted.

The maser device 310 may include a display unit 315, a control unit 320, an input unit 325, and a communication unit 330. Also, the master device 310 may further include a memory 335.

The display unit 315 displays a predetermined screen image.

The control unit 320 reduces power consumption of the display unit 315 to display the predetermined screen image when the screen image mirroring is requested.

In particular, when the screen image mirroring is requested, the control unit 320 controls another device to mirror the predetermined screen image, and the predetermined screen image to be transmitted to the other display apparatus. In addition, the control unit 210 reduces the power consumption used to display the predetermined screen image in the display unit 315. That is, the control unit 320 may reduce the power consumption used to display the predetermined screen image in the display unit 315 after the screen image mirroring is performed.

Also, the control unit 320 generates a screen image that the display unit 315 displays. The control unit 320 may generate a Transform Stream (TS) by encoding and multiplexing the video data corresponding to the displayed screen image when the screen image mirroring is requested. Accordingly, the communication unit 330 transmits the video data that has a TS form generated in the control unit 320 to the client device 360.

The input unit 325 receives a predetermined command or data through the predetermined screen image.

The communication unit 330 transmits the predetermined screen image generated in the control unit 320 to the client device 360 that is the other display apparatus. In particular, the communication unit 330 transmits the video data corresponding to the predetermined screen image to the client device 360.

The memory 335 may store a variety of data, programs used by the master device 310 to operate, data that is received/transmitted, etc.

The display unit 315 includes a display panel (not shown) that displays a screen image corresponding to the video data, and displays the screen image on the display panel. Referring to FIG. 2, the display unit 315 may display the menu screen image 215.

Also, the input unit 325 may be formed of a touch screen image. The input unit 325 includes a touch pad (not shown) combined with the display panel (not shown), and outputs the touch screen image through the display panel. When the input unit 325 receives the predetermined command through the touch screen image, the touch pad may detect the received predetermined command.

For example, when the input unit 325 is formed of the touch screen image, the input unit 325 may output the menu screen image 215 that is a user interface screen image to the display panel combined with the touch pad. When the user touches a predetermined point of the user interface screen image, for example, a point 216 where a mirroring service menu is displayed, the input unit 325 detects the touched point. Information regarding the detected point maybe transmitted to the control unit 320.

The control unit 320 recognizes a request or a command of the user, which corresponds to a menu displayed on the detected point. In the above example, since the point where the mirroring service menu displayed is touched, information that requests the implementation of the mirroring service may be transmitted to the control unit 320. Alternatively, location information on a point that the input unit 325 is displayed is transmitted to the control unit 320, and then the control unit 320 detects that a menu corresponding to the location information is the mirroring service menu, and controls the master device 310 to implement the mirroring service.

Hereinafter, a function in which the input unit 325 outputs the user interface screen image, and receives the predetermined command or data from the user is a user interface function.

In the above example, according to a request for implementing the mirroring service, the control unit 320 decodes a screen image that is currently displayed, for example, the menu screen image 215, and transmits the decoded screen image to the client device 360 through the communication unit 330.

In general, the user implements the mirroring service in order to look at the mirroring screen image through the client device 360. In most cases, the user looks at the screen image displayed on the client screen image 360. Therefore, when the screen image mirroring is requested, the user may not feel inconvenienced if the power consumption used to display the screen image of the master device 310 is reduced. When the mirroring service is performed, the power consumed to display the screen image of the master device 310 is reduced. An operation for reducing the power consumption will be described in detail later. The operation for reducing the power consumption, which is performed by the control unit 320, may be implemented by reducing or blocking voltage applied to the display pixels (not shown). The display pixels are components of the display panel included in the display unit 315, and they are well known to one of ordinary skill in the art so that the detailed descriptions will be omitted.

The operation for reducing the power consumption, which is performed by the control unit 320, will be further described later with reference to FIG. 4.

Figure 4:
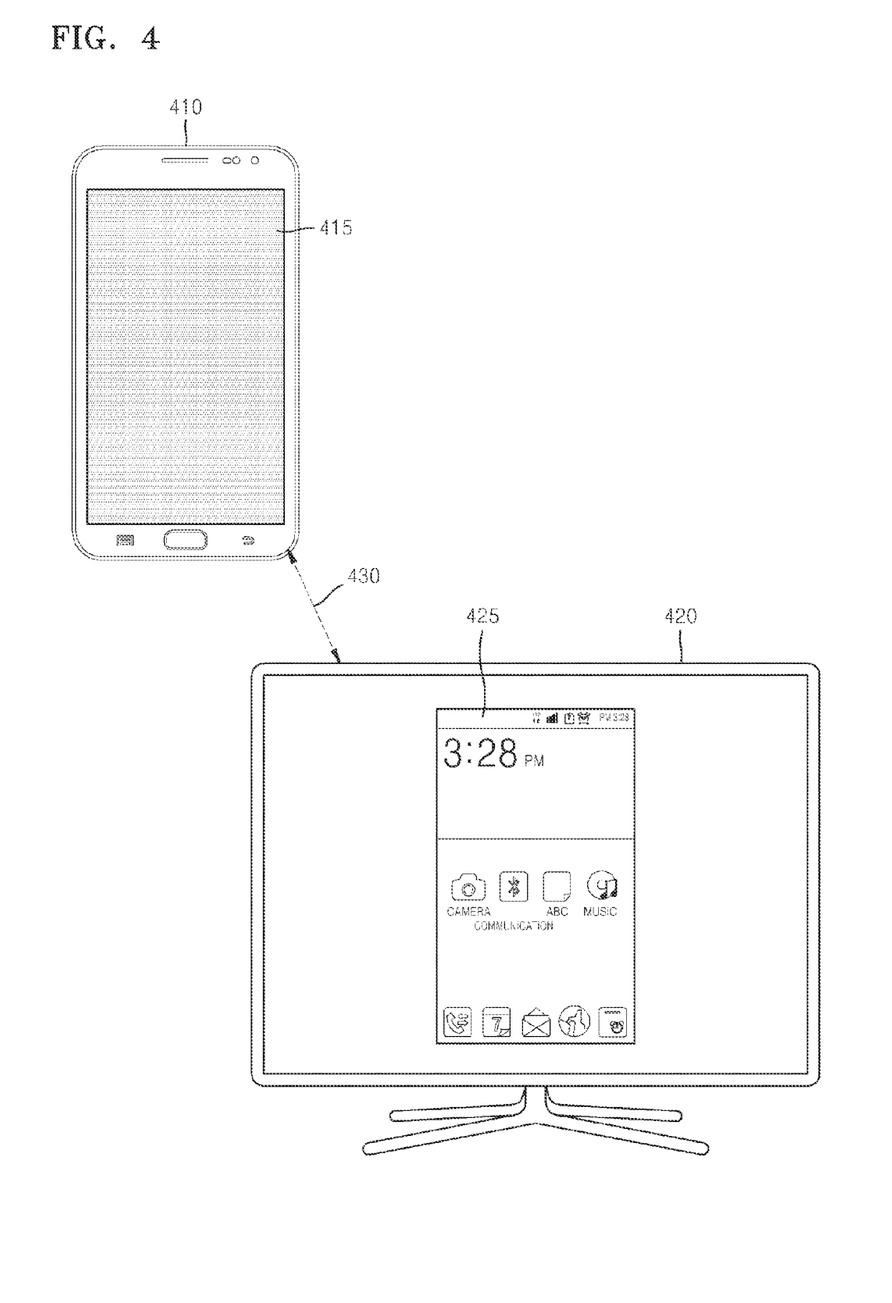
FIG. 4 is a view illustrating an operation for reducing power consumption of a control unit according to an embodiment of the present disclosure.

FIG. 4 is a view illustrating the operation for reducing the power consumption of the control unit 320 according to an embodiment of the present disclosure.

Referring to FIG. 4, a master device 410, a predetermined network 430, and a client device 420 correspond to the master device 210, the predetermined network 230, and the client device 220 of FIG. 2. Also, the master device 410, the predetermined network 430, and the client device 420 correspond to the master device 310, the predetermined network 350, and the client device 360 of FIG. 3. Therefore, the descriptions that are already provided with reference to FIGS. 2 and 3 will be omitted.

When the screen image mirroring is performed, the control unit 320 may control the display unit 315 to display the predetermined screen image in black.

The display panel (not shown) displaying the predetermined screen image may include a Liquid Crystal Display (LCD) panel, a Plasma Display Panel (PDP), a Light-Emitting Diode (LED) panel, an Organic LED (OLED) panel, or the like. The LCD panel includes LCD pixels, the PDP panel includes PDP pixels, the LED panel includes LED pixels, and the OLED panel includes OLED pixels.

Brightness of the screen image to be displayed may be adjusted by adjusting a voltage applied to each pixel described above.

The control unit 320 blocks the voltage applied to the display pixels included in the display panel (not shown), and turns off the screen image display of the display panel.

Alternatively, the control unit 320 may apply the voltage, which is applied to the display pixels included in the display panel (not shown), at a predetermined offset value close to 0 in order to display the predetermined screen image in black. The predetermined offset value may be a voltage value applied to the pixels to display the predetermined screen image in black. Accordingly, the display unit 315 displays a black screen image when the screen image mirroring is performed.

Alternatively, when the screen image mirroring is performed, the control unit 320 may reduce the brightness of the predetermined screen image displayed on the display unit 315 by a predetermined offset.

The predetermined offset may be set by the user, or by the control unit 320 with consideration for a state of providing power, brightness of a neighboring area, etc. of the master device 310.

Hereinafter, a power reduction mode is an operation mode in order for the control unit 320 to control the power consumed to display the predetermined screen image to be reduced.

Referring to FIG. 4, when the mirroring service is requested, the master device 410 changes the displayed screen image to a black screen image 415. When the client device 420 mirrors the screen image of the master device 410 and then completes displaying the mirroring screen image 425, the master device 410 changes the menu screen image 215 illustrated in FIG. 2 to the black screen image 415 of FIG. 4, and outputs the changed screen image.

Also, the control unit 320 may change the displayed screen image to the black screen image 415 at a point in time when the mirroring service is requested, for example, a point when the user touches the mirroring service menu 216 on the predetermined screen image 215, even though the mirroring screen image 425 is not yet output.

While the screen image mirroring is performed, the control unit 320 may maintain the operation in which the input unit 325 receives the predetermined command or data. The control unit 320 may maintain the voltage of operating the touch pad (not shown) used to receive the predetermined command or data although the voltage applied to the display pixels forming the display panel (not shown) of the display unit 315 is reduced or blocked. Accordingly, the user may manipulate the master device 310 while looking at the mirroring screen image displayed on the client unit 360 during the power reduction mode.

The client unit 360 may include a communication unit 370, a control unit 375, and a display unit 380. Also, the client unit 360 may further include an input unit 385, and a memory 390.

The communication unit 370 may be connected to the communication unit 330 of the master device 310 through the predetermined network 350, and may receive the predetermined screen image received from the communication unit 330.

The communication unit 370 may receive the video data corresponding to the predetermined screen image displayed on the display unit 315. The video data may be transmitted as the TS form.

The control unit 375 may generate the screen image corresponding to the received video data. The video data transmitted as the TS form is de-multiplexed and decoded in order to generate the mirroring screen image.

The display unit 380 displays the mirroring screen image that is the received predetermined screen image.

Each of the display unit 380, the control unit 375, the input unit 385, the communication unit 370, and the memory 390 included in the client unit 360 may performed the same operations as each of the display unit 315, the control unit 320, the input unit 325, the communication unit 330, and the memory 335 of the master device 310. Therefore, the repeated descriptions with regard to the client and master devices 360 and 310 will be omitted.

As described above, when the screen image mirroring is performed, the master device 310 may maintain the operation of the input unit 325 for receiving the predetermined command or data even though the power consumption of the display unit 315 to display the predetermined screen image is reduced. That is, the input unit 325 may perform the user interface function in the power reduction mode.

Figure 5:
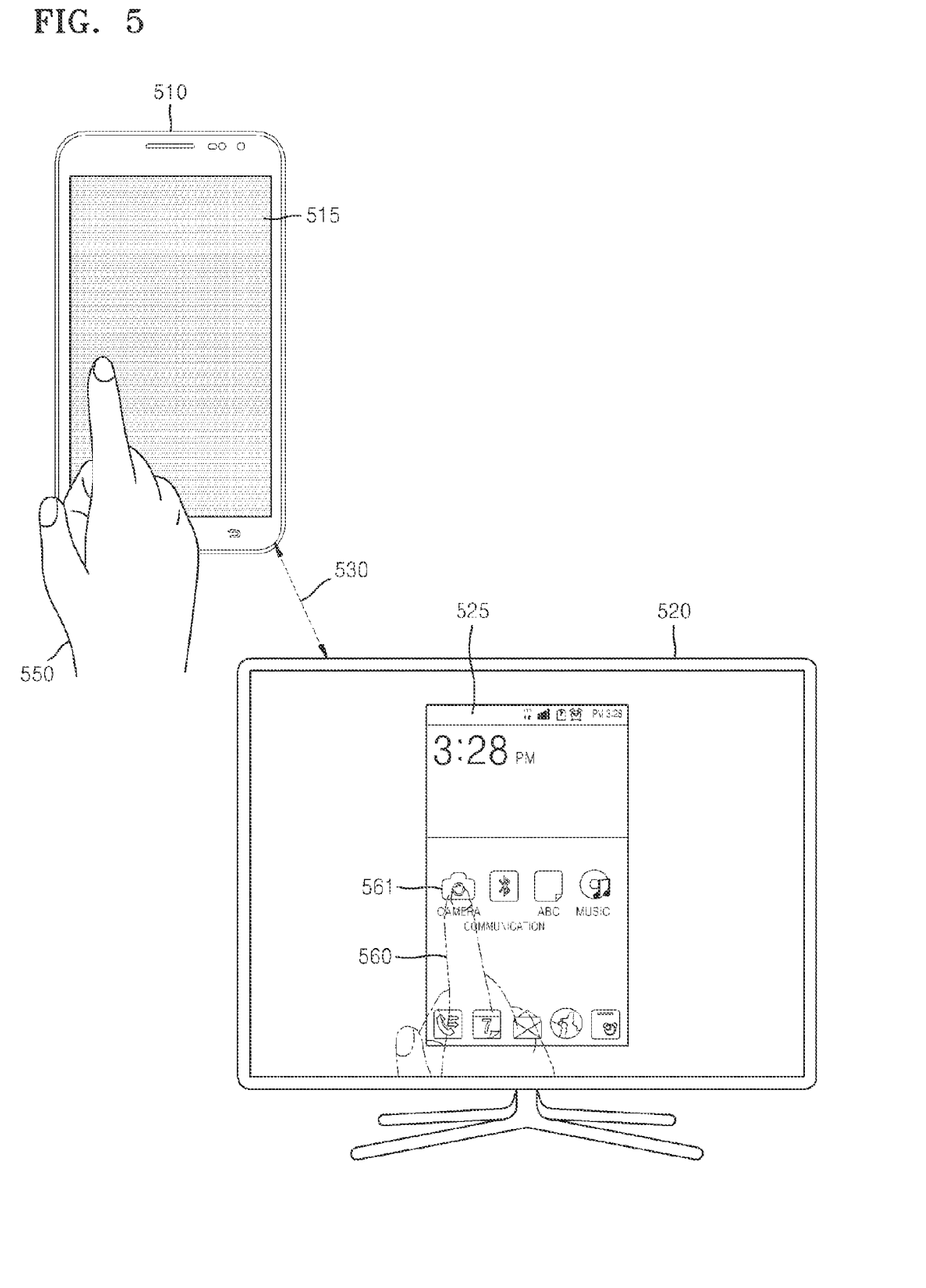
FIG. 5 is a view illustrating an operation for inputting a hovering event of an input unit according to an embodiment of the present disclosure.

FIG. 5 is a view illustrating an operation for inputting a hovering event of an input unit according to an embodiment of the present disclosure.

The input unit 325 detects the movement of the user's fingers, and receives the hovering event according to the movement of the user's fingers. The hovering event is an operation that corresponds to the operation in which the user tries to touch the menu displayed on the screen image by reaching a hand of the user to the touch screen image, and is detected by the input unit 325. That is, in a case where the user does not touch the menu displayed on the screen image, but moves the fingers near the touch screen image, an input event that the input unit 325 inputs corresponding to the movement of the user is the hovering event.

Based on the hovering event, the control unit 320 may generate the mirroring screen image to display the movement of the user's fingers on the predetermined screen image.

The control unit 320 may control the information on the finger location corresponding to the movements of the fingers detected by the input unit 325 to be transmitted to the client unit 360. The information on the finger location is information used to display the movements of the fingers on the screen image, and may include at least one of shapes of the user's fingers or the finger location.

In this case, the control unit 375 of the client device 360 receives the information on the finger location transmitted to the communication unit 370. Based on the information on the finger location, the control unit 375 may generate the mirroring screen image by displaying the virtual finger 560 corresponding to the movements of the user's fingers on the screen image, which is transmitted by the master device 310.

Referring to FIG. 5, a master device 510, a predetermined network 530, and a client device 520 may respectively correspond to the master device 210, the predetermined network 230, and the client device 220 of FIG. 2. Also, the master device 510, the predetermined network 530, and the client device 520 may respectively correspond to the master device 410, the predetermined network 430, and the client device 420 of FIG. 4. Therefore, the repeated descriptions with regard to FIGS. 2 and 4 will be omitted.

Referring to FIGS. 3 and 5, when the mirroring service is requested, the display unit 315 of the master device 310 runs the power reduction mode. Therefore, the master device 510 may display a black screen image 515. The client device 520 may display a mirroring screen image 525.

The user may manipulate the master device 510 while looking at the mirroring screen image 525 displayed on the client device 520. When the user reaches the fingers to the black screen image 515 of the master device 510, the input unit 325 receives the hovering event corresponding to the movements of the user's fingers.

The control unit 320 reflects the hovering event, and generates the mirroring screen image 525. The mirroring screen image 525 is a screen image that additionally displays the virtual finger 560 on the predetermined screen image, for example, the screen image 215 of FIG. 2 in order to display the movements of the user's fingers.

The control unit 320 detects a point where the hovering event occurs, and recognizes the finger location of the user.

The mirroring screen image 525 is generated by displaying the virtual finger 560 on the mirrored menu screen image.

Referring to FIG. 5, in a case where the fingers 550 of the user are disposed on a camera menu 561, the input unit 325 detects that the fingers 550 of the user are disposed on the camera menu 561, and transmits detection information to the control unit 320.

The control unit 320 generates the mirroring screen image 525 displaying the virtual finger 560 on the predetermined screen image to be mirrored in order to transmit the mirroring screen image 525 to the client device 360 through the communication unit 330.

The input unit 325 may recognize the predetermined motions including the at least one of the touching and dragging motions in order to detect the movements of the fingers by not performing an operation of recognizing the hovering event while the screen image mirroring is performed.

For example, in a case where a separate detection sensor (not shown) is used to recognize the hovering event, the detection sensor (not shown) for detecting the movements of the user continues operating throughout the screen image in order for the input unit 325 to receive the hovering event. Therefore, only in a case where an event corresponding to a certain operation is input, the movements of the user that replace the hovering event may be recognized to reduce the power consumption which the input unit 325 requires to keep operating the detection sensor (not shown).

For example, when a double-clicking operation in which two-time touch motions are input in a row is input after a dragging motion, the double-clicking operation is recognized as the hovering event, and the mirroring screen image 525 displaying the virtual finger 560 on a dragged point may be displayed.

As another example, when two fingers simultaneously dragged, the dragging operation may be recognized as the hovering event.

The operation that replaces the hovering event, for example, the dragging operation after double clicking may be set as a predetermined operation by the master device 310 or the user.

Also, when the control unit 320 does not transmit the mirroring screen image 525 including the virtual screen image, and makes the information on the finger location transmitted to the master device 360. Accordingly, the control unit 375 of the master device 360 may autonomously generate the mirroring screen image 525 displaying the virtual finger 560 using the information on the finger location. When the predetermined operation is recognized instead of the hovering event, the control unit 320 may generate the information on the finger location on the basis of the detected predetermined motion, and the generated location on the finger location may be transmitted to the master device 360.

When the mirroring service is performed, the display apparatuses reduce the power consumption of the display of the master device 360 so as to reduce the power consumption generated while performing the mirroring service.

In addition, the user may manipulate the master device 360 by looking at the client device only as the mirroring screen image 525 is output from the client device 360 by displaying the virtual finger 560.

Figure 6:
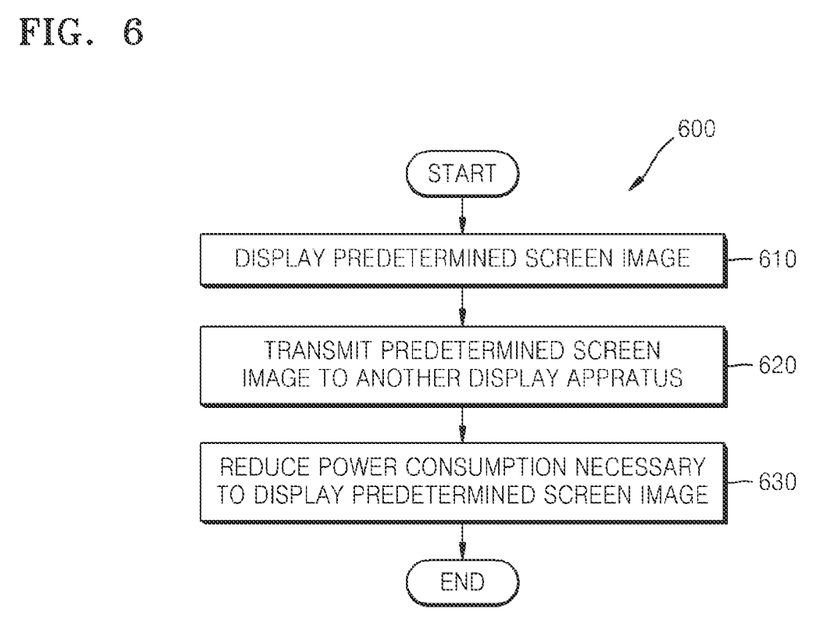
FIG. 6 is a flowchart illustrating a method of mirroring a screen image according to an embodiment of the present disclosure.

FIG. 6 is a flowchart illustrating a method 600 for mirroring the screen image according to an embodiment of the present disclosure. Respective motions in each operation of the method 600 for mirroring the screen image have the same motions and technical concept as the display apparatuses illustrated with reference to FIGS. 1 to 5. Hereinafter, with reference to FIGS. 3 and 6, the method 600 for mirroring the screen image will be described.

Referring to FIG. 6, the method 600 for mirroring the screen image displays the predetermined screen image in operation 610.

The master device 310 displays the predetermined screen image through the display unit 315. For example, when the displayed predetermined screen image includes the user interface screen image, the predetermined command or data will be input through the user interface screen image. Then, the control unit 320 may perform the operation corresponding to the input command or data.

When the screen image mirroring is requested, the predetermined screen image displayed in operation 610 is transmitted to another display apparatus such as a client apparatus in operation 620.

For example, the master device 310 may receive a request for implementing the mirroring service through the input unit 325. Accordingly, the control unit 320 generates the video data corresponding to the screen image displayed on the display unit 315. The communication unit 330 transmits the video data generated in the control unit 320 to the client device 360 that is the other display apparatus through the predetermined network 350. That is, the control unit 320 transmits the video data corresponding to the predetermined screen image to the client device 360 through the communication unit 330 in order for the predetermined screen image displayed on the display unit 315 to be mirrored and displayed on the client device 360.

When the screen image mirroring is performed, the power consumption used to display the predetermined screen image is reduced in operation 630. In particular, the control unit 320 reduces the power consumption used to display the predetermined screen image on the display unit 315.

When the screen image mirroring is performed, the display unit 320 may display the predetermined screen image in black.

When the screen image mirroring is performed, the display unit 320 may reduce the brightness of the predetermined screen image by the predetermined offset.

When the screen image mirroring is performed, the display unit 320 may stop displaying the predetermined screen image.

Figure 7:
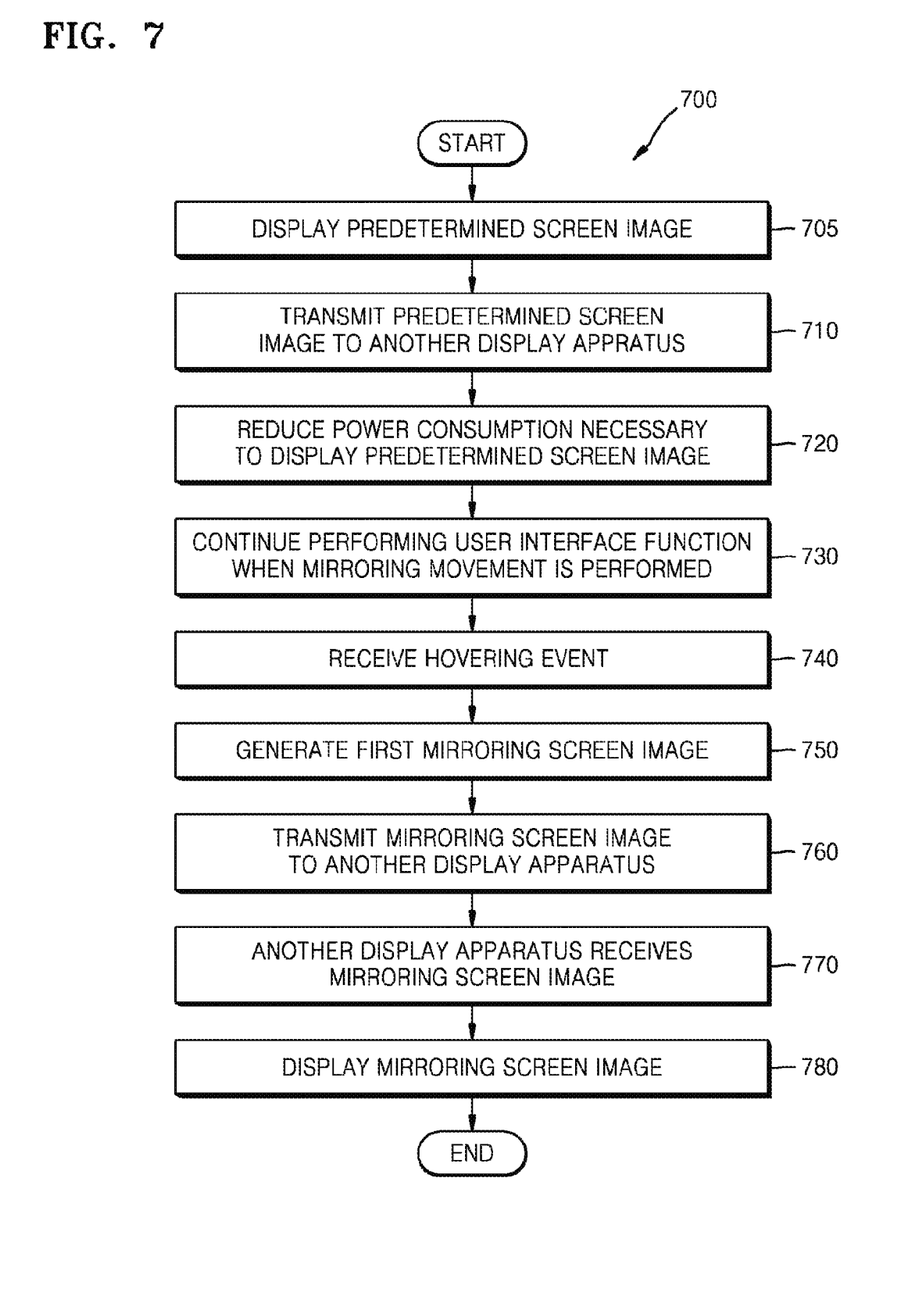
FIG. 7 is a flowchart illustrating a method of mirroring a screen image according to another embodiment of the present disclosure.

FIG. 7 is a flowchart illustrating the method 700 for mirroring the screen image according to another embodiment of the present disclosure.

Referring to FIG. 7, operations 705, 710, and 720 exactly correspond to the operations 610, 620, and 630 of FIG. 6, and thus the repeated descriptions will be omitted.

Respective operations in each operation of the method 700 for mirroring the screen image have the same operations and technical concept as the display apparatuses illustrated with reference to FIGS. 1 to 5. Therefore, with regard to the detailed descriptions for the method 700 for mirroring the screen image, the descriptions that are already provided with reference to FIGS. 1 to 5 will be omitted. Hereinafter, with reference to FIGS. 3 and 7, the method 700 for mirroring the screen image will be described.

Referring to FIG. 7, the method 700 for mirroring the screen image displays the predetermined screen image in operation 705.

When the screen image mirroring is requested, the predetermined screen image displayed in operation 705 is transmitted to another display apparatus in operation 710.

When the screen image mirroring is requested, the power consumption used to display the predetermined screen image is reduced in operation 720.

When the screen image mirroring is performed, a user interface function continues being performed in operation 730. In particular, the input unit 325 continues receiving the predetermined command or data while the screen image mirroring is performed.

That is, when the screen image mirroring is performed, the control unit 320 may control the operation of the input unit 325 for receiving the predetermined command or data to be maintained although the control unit 320 reduces the power consumption to display the predetermined screen image on the display unit 315. That is, the input unit 325 performed the user interface function even in the power reduction mode.

In operation 740, the hovering event may be input by recognizing the movements of the user's fingers. Operation 740 may be performed in the input unit 325.

In addition, the input unit 325 may recognize the predetermined operations including at least one of the touching and dragging operations corresponding to the hovering event. That is, by recognizing the predetermined operations corresponding to the hovering event, the input unit 325 may receive the predetermined operations instead of the hovering event.

Based on the hovering event input in operation 740, the mirroring screen image is generated to display the movements of the fingers on the predetermined screen image in operation 750. Operation 750 may be performed in the control unit 320.

In operation 750, the mirroring screen image may be generated by additionally displaying the virtual finger 560 on the predetermined screen image to represent the movements of the user's fingers.

In operation 750, the control unit 320 may generate the information on the finger location instead of generating the mirroring screen image displaying the movements of the fingers. Also, the control unit 320 may control to make the generated information on the finger location transmitted to the client device 360.

In operation 760, the mirroring screen image generated in operation 750 is transmitted to the client device 360 that is the other display apparatus. Operation 760 may be performed in the communication unit 330. When the information on the finger location is generated in operation 750, the communication unit 330 may transmit the information on the finger location generated in the control unit 320 to the client device 360.

The mirroring screen image transmitted in operation 760 may be received by the client device 360 that is the other display apparatus in operation 770. Operation 770 may be performed in the communication unit 370 of the client device 360. The communication unit 370 of the client device 360 may receive the information on the finger location.

In operation 780, the mirroring screen image received in operation 770 is displayed. Operation 780 may be performed in the display unit 380 of the client device 360. The screen image displayed in operation 780 is the mirroring screen image that additionally displays the virtual finger 560 on the predetermined screen image to represent the movements of the user's fingers.

When the information on the finger location is generated in operation 750, and is transmitted in operation 760, the control unit 375 may generate the mirroring screen image displaying the virtual finger 560 on the predetermined screen image transmitted in operation 710 based on the information on the finger location. The control unit 375 may control the mirroring screen image displaying the virtual finger 560 to be displayed.

As described above, the method for mirroring the screen image and the display apparatuses thereof according to an embodiment of the present disclosure may reduce the power consumption generated while using the mirroring service.

The method for mirroring the screen image and the display apparatuses according to another embodiment of the present disclosure help the user to use the mirroring service by looking only at the client screen image for user's convenience in using the mirroring service.

As described above, according to the one or more of the above embodiments of the present disclosure, the method for mirroring the screen image and the display apparatus therefor may reduce the power consumption while using the mirroring service. According to an embodiment of the present disclosure, the method for mirroring the screen image and the display apparatus therefor may help the users watch only the client screen image to use the mirroring service without inconvenience Embodiments of the present disclosure may be in the form of a non-transitory computer-readable storage medium encoded with instructions to perform the above methods. The computer readable code can be recorded/transferred on a medium in a variety of ways, with examples of the medium including recording media, such as magnetic storage media (e.g., Read Only Memory (ROM), floppy disks, hard disks, etc.) and optical recording media (e.g., Compact Disc ROMs (CD-ROMs) or Digital Versatile Discs (DVDs)). Thus, the medium may be such a defined and measurable structure including a signal or information, such as a device carrying, however briefly, a bitstream according to one or more embodiments of the present disclosure. The media may also be a distributed network, so that the computer readable code is stored/transferred and executed in a distributed fashion. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment should typically be considered as available for other similar features or aspects in other embodiments.

While the present disclosure has been shown and described with reference various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
a display configured to display a predetermined screen image;
an input interface configured to receive a predetermined command;
at least one processor configured to:
reduce a power consumption used to display the predetermined screen image when another display apparatus mirrors the predetermined screen image, and control to display the mirrored predetermined screen image; and
a transceiver configured to transmit the predetermined screen image to the other display apparatus,
wherein, in response to the reception of the predetermined command from a user by the input interface, the at least one processor is further configured to generate a command executing image corresponding to the predetermined command,
wherein the transceiver is further configured to transmit the generated command executing image to the other display apparatus,
wherein the input interface is further configured to detect a movement of a user's finger and receives a hovering event according to the movement, and
wherein, on a basis of the received hovering event, the at least one processor is further configured to generate a mirroring screen image to display the movement of the user's finger on the predetermined screen image.

2. The display apparatus of claim 1, wherein the at least one processor is further configured to control the input interface to continue receiving the predetermined command or data while screen image mirroring is performed.

3. The display apparatus of claim 2, wherein the at least one processor is further configured to reduce the power consumption by displaying a black screen image on the display when the screen image mirroring is performed.

4. The display apparatus of claim 2, wherein the at least one processor is further configured to reduce the power consumption by reducing a brightness of the predetermined screen image by a predetermined offset when the screen image mirroring is performed.

5. The display apparatus of claim 2, wherein the at least one processor is further configured to reduce the power consumption by making the display stop displaying the predetermined screen image when the screen image mirroring is performed.

6. The display apparatus of claim 1,
wherein the transceiver is connected to the other display apparatus via a predetermined network, and
wherein the other display apparatus is further configured to display the mirroring screen image received from the transceiver.

7. The display apparatus of claim 1, wherein the command executing image comprises a virtual finger corresponding to the finger of the user on the screen image.

8. The display apparatus of claim 1, wherein the predetermined command comprises at least one movement from among touching, dragging and hovering movements in order to detect a movement of a user's finger.

9. The display apparatus of claim 8, wherein the power consumption is further reduced by not operating a detection sensor.

10. The display apparatus of claim 1,
wherein the input interface is further configured to detect a movement of a user's finger, and
wherein the at least one processor is further configured to transmit information on a finger location, corresponding to the detected movement of the user's finger, to the other display apparatus.

11. A method of mirroring a screen image in a display apparatus, the method comprising:
displaying a predetermined screen image;
when screen image mirroring is requested, transmitting the predetermined screen image to another display apparatus in order for the other display apparatus to mirror the predetermined screen image;
reducing a power consumption used to display the predetermined screen image when the screen image mirroring is performed;
continuing receiving a predetermined command or data while the screen image mirroring is performed;

generating, in response to the reception of the predetermined command from a user, a command executing image corresponding to the predetermined command; and generating a mirroring screen image to display a movement of the user's finger on the screen image based on the hovering event, wherein the generated command executing image is transmitted to the other display apparatus, and wherein the transmitting of the predetermined screen image to other display apparatus comprises transmitting the mirroring screen image to the other display apparatus.

12. The method of claim 11, wherein the reducing of the power consumption comprises displaying a black screen image on the display when the screen image mirroring is performed.

13. The method of claim 11, wherein the reducing of the power consumption comprises reducing a brightness of the predetermined screen image by a predetermined offset when the screen image mirroring is performed.

14. The method of claim 11, wherein the reducing of the power consumption comprises stopping displaying the predetermined screen image when the screen image mirroring is performed.

15. The method of claim 11, wherein the receiving of the predetermined command or data comprises:

detecting a movement of a user's finger; and receiving a hovering event according to the movement of the user's finger.

16. The method of claim 11, further comprising:

detecting the movement of the user's finger; and transmitting information on a finger location, corresponding to the detected movement of the user's finger, to the other display apparatus.

17. The method of claim 16, further comprising:

receiving the information on the finger location from the other display apparatus;

generating the mirroring screen image by additionally displaying a virtual finger corresponding to the user's finger on the predetermined screen image on the basis of the received information on the finger location; and displaying the mirroring screen image on which the virtual finger is displayed on the other display apparatus.

18. The method of claim 11, wherein the command executing image comprises a virtual finger corresponding to a finger of the user on the predetermined screen image, and wherein the predetermined command comprises at least one movement from among touching, dragging and hovering movements in order to detect a movement of the user's finger.

* * * * *